(12) United States Patent
Che et al.

(10) Patent No.: US 12,725,806 B2
(45) Date of Patent: Sep. 1, 2026

(54) BATTERY PLATE, ELECTRODE ASSEMBLY, BATTERY CELL, BATTERY AND POWER CONSUMING DEVICE

(71) Applicant: CONTEMPORARY AMPEREX TECHNOLOGY (HONG KONG) LIMITED, Hong Kong (CN)

(72) Inventors: Huan Che, Ningde (CN); Wei Chen, Ningde (CN); Baohua Xu, Ningde (CN); Zi Wang, Ningde (CN); Shisong Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 625 days.

(21) Appl. No.: 18/133,527

(22) Filed: Apr. 12, 2023

(65) Prior Publication Data

US 2023/0246199 A1 Aug. 3, 2023

Related U.S. Application Data

(63) Continuation of application No. PCT/CN2021/109917, filed on Jul. 30, 2021.

(51) Int. Cl.
*H01M 4/66* (2006.01)
*H01M 4/70* (2006.01)

(52) U.S. Cl.
CPC ............. *H01M 4/667* (2013.01); *H01M 4/70* (2013.01)

(58) Field of Classification Search
None
See application file for complete search history.

(56) References Cited

U.S. PATENT DOCUMENTS 10,916,769 B2 2/2021 Su et al.
2004/0202928 A1 10/2004 Miyamoto et al.
(Continued)

FOREIGN PATENT DOCUMENTS

CN 1525591 A 9/2004
CN 109244362 A 1/2019
(Continued)

OTHER PUBLICATIONS

Machine translation of CN111326711A, published on Jun. 23, 2020 (Year: 2020).*
(Continued)

*Primary Examiner* — Anca Eoff
(74) *Attorney, Agent, or Firm* — XSENSUS LLP

(57) ABSTRACT

A battery plate may include a current collector, wherein at least one face of the current collector may include a coated area and an uncoated area that may be connected, the coated area may be coated with an active material layer and an insulation layer, and the insulation layer may be located on one side of the active material layer close to the uncoated area. The insulation layer may include a first part and a second part that may be connected, the second part may be located in an edge area of the insulation layer close to the active material layer, and the active material layer may be configured to cover the second part, such that the active material layer may partially overlap with the insulation layer in a thickness direction of the plate.

11 Claims, 5 Drawing Sheets

(56) References Cited

U.S. PATENT DOCUMENTS

| | | | | |
|---|---|---|---|---|
| 2005/0134227 | A1* | 6/2005 | Wozniak | H02J 7/0031 320/134 |
| 2014/0255778 | A1 | 9/2014 | Huh et al. | |
| 2014/0255796 | A1* | 9/2014 | Matsuoka | H01M 4/139 429/188 |
| 2020/0144605 | A1 | 5/2020 | Su et al. | |
| 2020/0144673 | A1 | 5/2020 | Tao et al. | |
| 2021/0036332 | A1* | 2/2021 | Kawamoto | H01M 4/366 |
| 2021/0135206 | A1 | 5/2021 | Su et al. | |

FOREIGN PATENT DOCUMENTS

| | | | |
|---|---|---|---|
| CN | 109449478 | A | 3/2019 |
| CN | 111326711 | A | 6/2020 |
| CN | 111668451 | A | 9/2020 |
| CN | 112310396 | A | 2/2021 |
| CN | 112310409 | A | 2/2021 |
| EP | 3648204 | A1 | 5/2020 |
| JP | 2020-167067 | A | 10/2020 |
| JP | 2021-026852 | A | 2/2021 |
| KR | 20210015680 | A | 2/2021 |
| WO | 2020/203658 | A1 | 10/2020 |

OTHER PUBLICATIONS

International Search Report and Written Opinion mailed on Mar. 2, 2022, received for PCT Application PCT/CN2021/109917, filed on Jul. 30, 2021, 12 pages including English Translation.

Office Action issued Apr. 10, 2025 in Korean Patent Application No. 10-2023-7011273 with English translation thereof.

Office Action issued Jun. 24, 2024 in Japanese Patent Application No. 2023-520500 with English translation thereof.

Extended European Search Report issued Jul. 17, 2024 in European Patent Application No. 21951411.4.

Office Action issued Sep. 12, 2025 in Chinese Patent Application No. 202180073295.3 with English translation thereof.

* cited by examiner

BATTERY PLATE, ELECTRODE ASSEMBLY, BATTERY CELL, BATTERY AND POWER CONSUMING DEVICE

CROSS-REFERENCE TO RELATED APPLICATION

The present application is a continuation of International Application No. PCT/CN2021/109917, filed Jul. 30, 2021, which is incorporated herein by reference in its entirety.

TECHNICAL FIELD

The present application relates to the technical field of energy storage devices, and particularly relates to a battery plate, an electrode assembly, a battery cell, a battery, and a power consuming device.

BACKGROUND ART

Battery cells are widely used in electronic devices, such as a mobile phone, a notebook computer, an electromobile, an electric vehicle, an electric airplane, an electric ship, an electric toy car, an electric toy ship, an electric toy airplane, and an electric tool. The battery cells may include a nickel-cadmium battery cell, a nickel-hydrogen battery cell, a lithium-ion battery cell, a secondary alkaline zinc-manganese battery cell, etc.

During use of the battery cells, lithium precipitation often occurs in the battery cells, and precipitated lithium tends to puncture separators and cause a short circuit, which will cause safety risks. Therefore, it is urgent to solve the problem of lithium precipitation of the battery cells.

SUMMARY OF THE DISCLOSURE

To solve the problem, the present application provides a battery plate, an electrode assembly, a battery cell, a battery, and a power consuming device, in which an active material layer and an insulation layer applied on the battery plate allow a clear boundary to be formed therebetween, which reduces the risk of lithium precipitation and improves the product yield.

A first aspect of an embodiment of the present application provides a battery plate. The battery plate includes a current collector, wherein at least one face of the current collector includes a coated area and an uncoated area that are connected, the coated area is coated with an active material layer and an insulation layer, and the insulation layer is located on one side of the active material layer close to the uncoated area. The insulation layer includes a first part and a second part that are connected, the second part is located in an edge area of the insulation layer close to the active material layer, and the active material layer is configured to cover the second part and not cover the first part, such that the active material layer partially overlaps with the insulation layer in a thickness direction of the plate.

The second part is covered with the active material layer, and the second part cannot permeate into an upper surface of the active material layer, such that the problem of the formation of a blurred boundary line in an edge area of the insulation layer close to the active material layer due to the mixing of coating slurry is reduced. In this way, a clear boundary line is formed, and the problem of lithium precipitation caused by unsatisfactory dimensions of a positive plate active material layer and a negative plate active material layer due to misjudgment of a boundary between the active material layers.

In some embodiments, the insulation layer has a thickness not greater than that of the active material layer.

There is a thickness difference between the thickness of the active material layer and the thickness of the insulation layer, such that the risk of slurries of the active material layer and of the insulation layer being mixed and permeating to an upper surface of the active material layer is reduced.

In some embodiments, the second part has a thickness not greater than that of the first part.

The thickness of the insulation layer is small, such that the problem of the formation of a bulged edge caused by a significant increase in the total thickness of the overlapping area of the active material layer and the insulation layer is reduced, and the uniformity of the overall thickness of the battery plate is improved.

In some embodiments, in the thickness direction, a shortest distance between a surface of the second part facing the current collector and a surface of the current collector is between 0 μm and 90 μm.

In some embodiments, a surface of the second part away from the current collector is a bevel, and the bevel is gradually gets closer to the current collector in a direction extending from the first part to the active material layer.

The surface of the second part away from the current collector is a bevel, such that the risk of the formation of a bulged edge caused by an increase in the coating thickness of the overlapping area of the active material layer and the second part is reduced. Also, during drying of the coatings, the active material layer tends to slip along the bevel when shrinking, such that the permeation and mixing of the coating slurry of the second part into the active material layer are reduced.

In some embodiments, in the thickness direction of the plate, a distance between the surface of the second part away from the current collector and the outer surface of the active material layer is not less than 20 μm.

The distance between the surface of the second part away from the current collector and the outer surface of the active material layer may be set such that it can be ensured that the second part is sufficiently far away from the outer surface of the active material layer, reducing the possibility of the coating slurry of the second part permeating to the outer surface of the active material layer.

In some embodiments, the second part has a maximum thickness of 3 μm-90 μm.

The thickness of the second part is set to be relatively small, and a change of a coating thickness of an overlapping area of the active material layer and the second part may also be relatively small, which will not resulting in a bulged edge due to a significant increase in the coating thickness of the overlapping area of the active material layer and the insulation layer.

In some embodiments, in an arrangement direction of the active material layer and the insulation layer, the second part has a width not greater than that of the first part.

The width of the first part and the width of the second part may be set to prevent an overlapping width of the second part and the active material layer from being too great.

A second aspect of an embodiment of the present application provides an electrode assembly, which includes the battery plate as described above.

A third aspect of an embodiment of the present application provides a battery cell, which includes the electrode assembly as described above.

A fourth aspect of an embodiment of the present application provides a battery, which includes a plurality of battery cells as described above.

A fifth aspect of an embodiment of the present application provides a power consuming device, which includes the battery as described above, and the battery is configured to provide electric energy.

It should be understood that the above general descriptions and the detailed description hereinafter are merely exemplary, and cannot limit the present application.

BRIEF DESCRIPTION OF THE DRAWINGS

To more clearly describe technical solutions of embodiments of the present application, the drawings to be used in the embodiments of the present application will be described briefly below. Obviously, the drawings in the following description are merely specific embodiments of the present application. For those skilled in the art, other embodiments may also be obtained according to the following drawings without any creative effort.

LIST OF REFERENCE SIGNS

Figure 1:
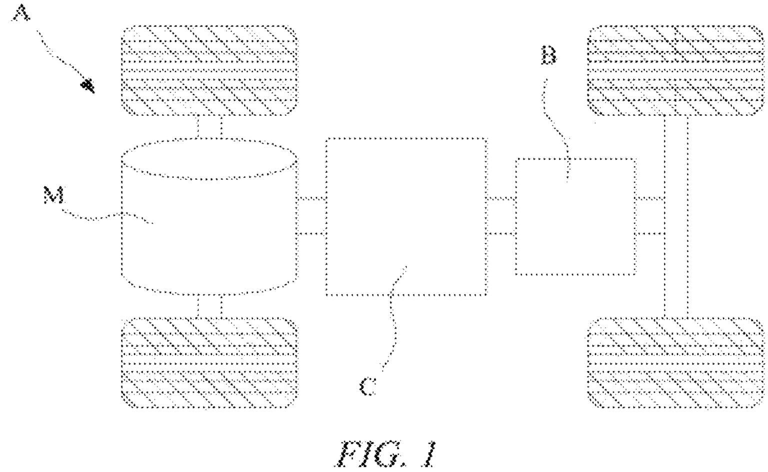
FIG. 1 is a schematic structural diagram of a power consuming device according to a particular embodiment of the present application.

- A—vehicle;
- B—battery;
- C—controller;
- D—battery cell;
- F—case;
  - F1—upper case;
  - F2—lower case;
- M—motor;
- 100—electrode assembly;
- 200—housing;
- 300—end cap assembly;
- 1—battery plate;
  - 1*a*—positive plate;
  - 1*b*—negative plate;
  - 11—current collector;
    - 11*a*—positive current collector;
    - 11*b*—negative current collector;
      - 111—electrode tab;
        - 111*a*—positive electrode tab;
        - 111*b*—negative electrode tab;
  - 12—active material layer;
    - 12*a*—positive active material layer;
    - 12*b*—negative active material layer;
  - 14—insulation layer;
    - 141—first part;
    - 142—second part;
  - 15—boundary line;
- 2—separator;
- X—width direction of plate;
- Y—lengthwise direction of plate;
- Z—thickness direction of plate.

The accompanying drawings herein are incorporated into the description and form a part of the description, illustrate the embodiments conforming to the present application, and are intended to explain principles of the present application together with the description.

DETAILED DESCRIPTION OF EMBODIMENTS

To better understand technical solutions of the present application, embodiments of the present application will be described in detail below with reference to the accompanying drawings.

It should be clear that the embodiments described are merely some of, rather than all of, the embodiments of the present application. All other embodiments obtained by those of ordinary skill in the art based on the embodiments of the present application without any creative effort shall fall within the scope of protection of the present application.

The terms used in the embodiments of the present application are merely for the purpose of describing specific embodiments, but are not intended to limit the present application. The terms "a/an", "the" and "this" of singular forms used in the embodiments and the appended claims of the present application are also intended to include plural forms, unless otherwise specified in the context clearly.

It should be understood that the term "and/or" used herein is merely intended to describe an associated relation of associated objects, representing that three relations may exist, for example, A and/or B, may include: the three instances of A alone, A and B simultaneously, and B alone. In addition, the character "/" herein generally indicates an "or" relation between the associated objects.

It should be noted that the directional terms such as "above", "under", "left", and "right" described in the embodiments of the present application are described as seen from the angles shown in the accompanying drawings, and should not be understood as limitations to the embodiments of the present application. In addition, in the context, it should be further understood that when an element is referred to as being "above" or "under" another element, the element can not only be directly connected "above" or "under" another element, but also be indirectly connected "above" or "under" another element by means of an intermediate element.

A battery mentioned in an embodiment of the present application refers to a single physical module including one or more battery cells to provide higher voltage and capacity. For example, the battery described in the present application may include a battery module, a battery pack, etc. The battery generally includes a case for packaging one or more battery cells. The case may prevent liquid or other foreign matters from affecting charging or discharging of the battery cells.

The battery cell includes an electrode assembly and an electrolyte, and the electrode assembly is composed of a positive plate, a negative plate and an separator. The battery cell operates mainly by relying on movements of metal ions between the positive plate and the negative plate. The positive plate includes a positive current collector and a positive active material layer. A surface of the positive electrode current collector is coated with the positive active material layer, the positive current collector not coated with the positive active material layer protrudes from the positive current collector coated with the positive active material layer, and the positive current collector not coated with the positive active material layer serves as a positive electrode tab. The negative plate includes a negative current collector and a negative active material layer. A surface of the negative current collector is coated with the negative active material layer, the negative current collector not coated with the negative active material layer protrudes from the negative current collector coated with the negative active material layer, and the negative current collector not coated with the negative active material layer serves as a negative electrode tab. In order to ensure that no fusing occurs when a large current passes, a plurality of positive electrode tabs are provided and are stacked together, and a plurality of negative electrode tabs are provided and are stacked together.

In the prior art, a current collector of a plate of the battery cell is usually coated with an active material layer and an insulation layer. The active material layer and the insulation layer have inconsistent colors. After the coating, a boundary between the active material layer and the insulation layer may be visually recognized to determine the width of the active material layer.

The applicant found that when the active material layer and the insulation layer are coated simultaneously, the active material layer and the insulation layer tends to permeate into each other and be mixed at the boundary during drying, and the insulation layer permeates into a surface of the active material layer, resulting in a blurred boundary between the resulting dried active material layer and insulation layer.

In the battery cell, it is required that an active material of the negative plate should cover an active material of the positive plate, that is, an active material layer of the negative plate should be wider than that of the positive plate, such that lithium precipitation is avoided. During drying, the active material layer and the insulation layer permeate into each other and are mixed, resulting in a blurred boundary, such that a deviation of determination of the position of the active material layer is caused, a situation where the positive plate in the electrode assembly is not completely covered by the negative plate may occur, then lithium precipitation of the battery cell at the position may occur, and the performance of the battery cell may be affected.

Based on the problems found by the applicant, a coating structure of the active material layer and the insulation layer coated on the battery plate is improved, and the active material layer and the insulation layer are provided to partially overlap with each other, so as to solve the problems. The embodiments of the present application will be further described below.

FIG. 1 is a schematic structural diagram of a power consuming device according to a particular embodiment of the present application.

As shown in FIG. 1, the embodiment of the present application provides a battery B and a power consuming device using the battery B as a power supply. The power consuming device using the battery B as the power supply includes a vehicle A, a ship, a small aircraft, etc. The battery B is used to provide electric energy to the device, so as to generate a driving force for driving the device. The device may also use both electric energy and other types of energy (such as fossil energy) to jointly generate a driving force. Any device that may use the battery B as the power supply falls within the scope of protection of the present application.

As shown in FIG. 1, with the vehicle A as an example of the power consuming device, the vehicle A in the embodiment of the present application may be a new energy vehicle which may be a battery electric vehicle, a hybrid electric vehicle or an extended range electric vehicle, etc. For example, the vehicle A includes a motor M, a controller C and the battery B. The battery B is horizontally arranged at the bottom of a vehicle body. The battery B is controlled by the controller C to supply power to the motor M. The motor M is connected to wheels on the vehicle body by means of a transmission mechanism so as to drive the vehicle A to run.

To meet different power demands, the battery B may include a plurality of battery cells D. The plurality of battery cells D may be in series connection, parallel connection or series-parallel connection. The series-parallel connection refers to a combination of series connection and parallel connection. The battery B may also be referred to as a battery pack. Optionally, the plurality of battery cells D may be connected in series, parallel or series-parallel to form a battery module, and then a plurality of battery modules may be connected in series, parallel or series-parallel to form the battery B. That is to say, the plurality of battery cells D may directly form the battery B, or may first form the battery modules that may then form the battery B.

Figure 2:
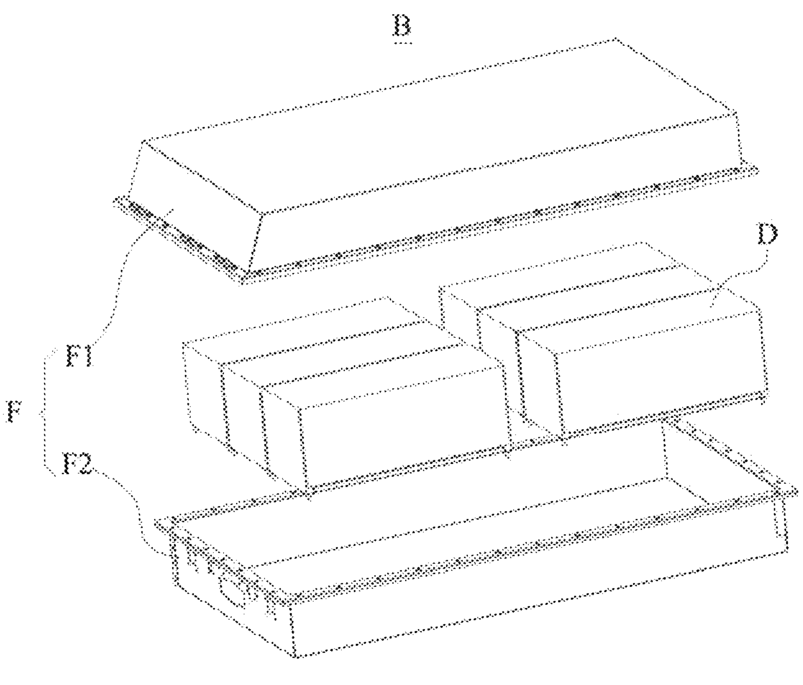
FIG. 2 is a schematic exploded diagram of a battery according to some embodiments of the present application.

FIG. 2 is a schematic exploded diagram of a battery B according to some embodiments of the present application.

As shown in FIG. 2, the battery B includes a case F and battery cells D, and the battery cells D are accommodated in the case F. The case F may have various shapes such as a cylinder and a cuboid. Of course, the case F may have various structures.

In some embodiments, the case F may include an upper case F1 and a lower case F2, and the upper case F1 and the lower case F2 covering each other to define an accommodating space for accommodating the battery cells D.

There may be one or more battery cells D in the battery B. If there are a plurality of battery cells D, the plurality of battery cells D may be in series connection or parallel connection or series-parallel connection. The series-parallel connection means that some of the plurality of battery cells D are in series connection and some are in parallel connection.

Figure 3:
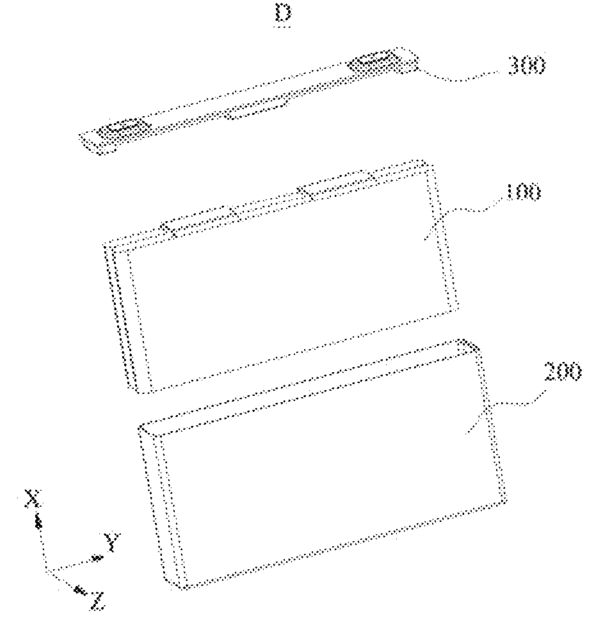
FIG. 3 is a schematic exploded diagram of a battery cell according to some embodiments of the present application.

FIG. 3 is a schematic exploded diagram of a battery cell D according to some embodiments of the present application.

As shown in FIG. 3, the battery cell D generally includes an electrode assembly 100, a housing 200 and an end cap assembly 300, the end cap assembly 300 covering an opening of the housing 200 to provide a closed space for the electrode assembly 100 and an electrolyte. The housing 200 may have various shapes such as a cylinder and a cuboid. The shape of the housing 200 may be determined depending on the specific shape of the electrode assembly 100. For example, if the electrode assembly 100 has a cylindrical structure, the housing 200 may be selected to have a cylindrical structure. If the electrode assembly 100 has a cuboidal structure, the housing 100 may be selected to have a cuboidal structure. It may be understood that the shape of the housing 200 may also be different from that of the electrode assembly 100.

As a example, in FIG. 3, the housing 200 has a hollow cuboidal structure with an open end. The housing 200 may be made of various materials, such as plastic, copper, iron, aluminum, stainless steel and an aluminum alloy, which is not specifically limited in the embodiment of the present application.

As shown in FIG. 3, the end cap assembly 300 is configured to seal the opening of the housing 200. During assembly of the battery cell D, the electrode assembly 100 is placed in the housing 200, then the electrode assembly 100 and the end cap assembly 300 are electrically connected and fixed, and end cap assemblies 300 on both sides are fixedly connected to the housing 200, so as to complete the assembly of the battery cell D.

Figure 4:
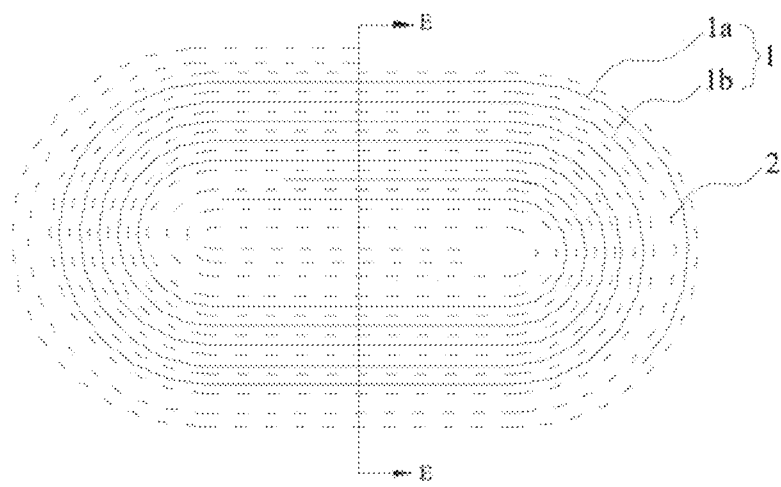
FIG. 4 is a schematic sectional view of an electrode assembly according to a particular embodiment of the present application.

FIG. 4 is a schematic sectional view of an electrode assembly 100 according to a particular embodiment of the present application.

As shown in FIG. 4, the electrode assembly 100 in the particular embodiment of the present application is formed by winding a battery plate 1 and an separator 2. The battery plate 1 includes a positive plate 1*a* and a negative plate 1*b*. The separator 2 is an insulator between the positive plate 1*a* and the negative plate 1*b*.

Figure 5:
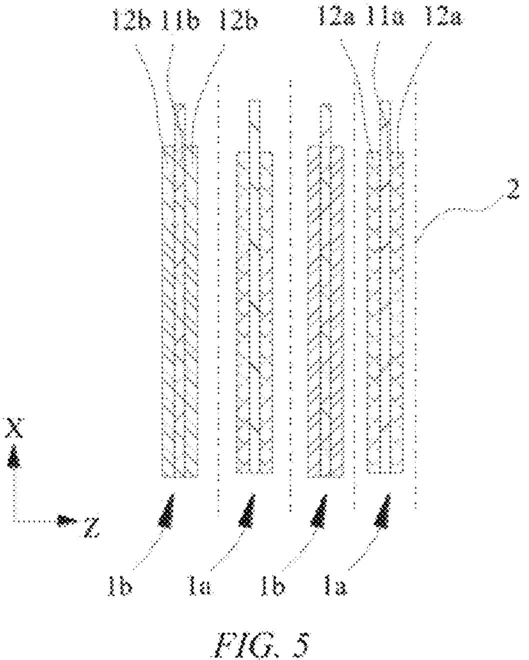
FIG. 5 is a schematic partial diagram of a sectional view of the electrode assembly in FIG. 4 taken along line E-E.

FIG. 5 is a schematic partial diagram of a sectional view of an electrode assembly 100 of FIG. 4 taken along line E-E.

As shown in FIG. 5, the positive plate 1*a* includes a positive current collector 11*a* and a positive active material layer 12*a*. The positive current collector 11*a* includes a coated area and an uncoated area. The positive active material layer 12*a* is applied on a surface of the coated area of the positive current collector 11*a*. In a width direction X of the plate, the uncoated area of the positive current collector 11*a* protrudes from the coated area to form a positive electrode tab 111*a* (see FIG. 6). Taking a lithium ion battery as an example, the positive current collector 11*a* may be made of aluminum, and the positive active material may be lithium cobalt oxide, lithium iron phosphate, ternary lithium, lithium manganate, etc. In a thickness direction Z of the plate, the positive active material layer 12*a* may only be applied on a surface of the positive current collector 11*a*, or both surfaces of the positive current collector 11*a* may be coated with the positive active material layer 12*a*. Both surfaces of the positive current collector 11*a* shown in FIG. 4 may be coated with the positive active material layer 12*a*.

The negative plate 1*b* includes a negative current collector 11*b* and a negative active material layer 12*b*. The negative current collector 11*b* includes a coated area and an uncoated area. The negative active material layer 12*b* is applied on a surface of the negative current collector 11*b*. In the width direction X of the plate, the uncoated area of the negative current collector 11*b* protrudes from the coated area to form a positive electrode tab 111*b* (see FIG. 6). The negative current collector 11*b* may be made of copper, and a negative active material may be carbon, silicon, etc. In the thickness direction Z of the plate, the negative active material layer 12*b* may only be applied on a surface of the negative current collector 11*b*, or both surfaces of the negative current collector 11*b* may be coated with the negative active material layer 12*b*. Both surfaces of the negative current collector 11*b* shown in FIG. 4 may be coated with the positive active material layer 12*a*.

Figure 6:
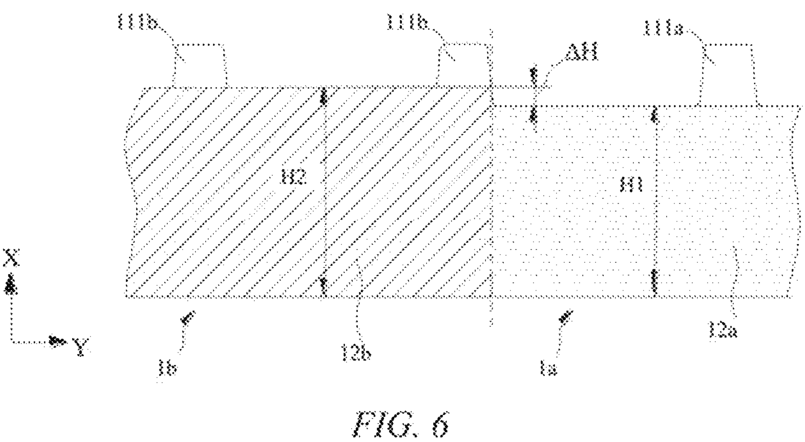
FIG. 6 is a partially unfolded comparative diagram of the positive plate and the negative plate according to some embodiments of the present application.

FIG. 6 is a partially unfolded comparative diagram of the positive plate 1*a* and the negative plate 1*b* according to some embodiments of the present application.

In some embodiments, the electrode assembly 100 is formed by winding the positive plate 1*a*, the negative plate 1*b*, and the separator 2 between the positive plate 1*a* and the negative plate 1*b*. After the electrode assembly 100 is unfolded, a structure with the laminated positive plate 1*a*, separator 2 and negative plate 1*b* is formed. FIG. 5 shows a partially unfolded schematic diagram of the positive plate 1*a* and the negative plate 1*b* in the electrode assembly 100. To clearly represent a dimensional relation between the positive plate 1*a* and the negative plate 1*b*, on unfolded separator 2 is shown in FIG. 6, and part of the negative plate 1*b* is removed at a right side of a dotted line in the figure, so as to show a dimensional state of the positive plate 1*a*.

As shown in FIG. 6, the coated area of the positive plate 1*a* is coated with the positive active material layer 12*a*, and the uncoated area thereof forms the positive electrode tab 111*a*. Positive electrode tabs 111*a* are arranged at intervals in a lengthwise direction Y of the plate in such a way that the plurality of positive electrode tabs 111*a* overlap with each other during winding of the electrode assembly 100. The coated area of the negative plate 1*b* is coated with the negative active material layer 12*b*, and the uncoated area thereof forms the negative electrode tab 111*b*. Negative electrode tabs 111*b* are arranged at intervals in the lengthwise direction Y of the plate in such a way that the plurality of negative electrode tabs 111*b* overlap with each other during assembly of the electrode assembly 100. Full lengths of the positive plate 1*a* and the negative plate 1*b* and all the positive electrode tabs 111*a* and negative electrode tabs 111*b* are not shown in FIG. 6.

In the width direction X of the plate, the negative active material layer 12*b* of the negative plate 1*b* covers the positive active material layer 12*a* of the positive plate 1*a*, that is, the positive active material layer 12*a* has a width H1 smaller than a width H2 of the negative active material layer 1*b*. Therefore, at least a width difference ΔH between the positive active material layer 12*a* and the negative active material layer 1*b* is kept. To satisfy performance requirements of the battery, the width difference ΔH generally is required to satisfy $0 \leq \Delta H \leq 2.5$ mm. In this way, it can be ensured that the negative active material layer 12*b* of the negative plate 1*b* covers the active material layer 12*a* of the positive plate, such that the risk of lithium precipitation may be reduced.

Figure 7:
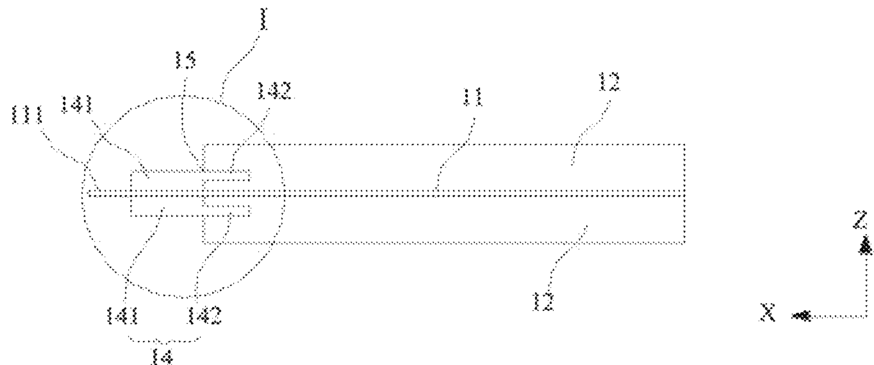
FIG. 7 is a sectional view of a battery plate according to an embodiment.

FIG. 7 is a sectional view of a battery plate 1 according to an embodiment.

As shown in FIG. 7, in a particular embodiment, both sides of the current collector 11 of the battery plate 1 in the thickness direction Z of the plate are coated with an active material layer 12 and an insulation layer 14, which is only an example, or only one surface of the current collector 11 is coated with the active material layer 12 and the insulation layer 14.

In some embodiments, the battery plate 1 includes the current collector 11. At least one face of the current collector 11 includes a coated area and an uncoated area that are connected. The coated area is coated with the active material layer 12 and the insulation layer 14. The insulation layer 14 is located on one side of the active material layer 12 close to the uncoated area, and the uncoated area forms an electrode tab 111. The battery plate 1 may be the positive plate 1*a* or the negative plate 1*b*. Both the positive plate 1*a* and the negative plate 1*b* may apply to structures in the following embodiments. In the case of the battery plate 1 acting as the positive plate 1*a*, the current collector 11 is the positive current collector 11*a*, and the electrode tab 111 is the positive electrode tab 111*a*. In the case of the battery plate 1 acting as the negative plate 1*b*, the current collector 11 is the negative current collector 11*b*, and the electrode tab 111 is the negative electrode tab 111*b*.

As shown in FIG. 7, the insulation layer 14 includes a first part 141 and a second part 142 that are connected. The second part 142 is located in an edge area of the insulation layer 14 close to the active material layer 12. The active material layer 12 is configured to cover the second part 142 and not cover the first part 141, such that projections of the active material layer 12 and the insulation layer 14 partially overlap in the thickness direction Z of the plate.

An edge of the active material layer 12 is connected to the first part 141, so as to create a boundary line 15. The second part 142 is covered by the active material layer 12, and the second part 142 cannot permeate into an upper surface of the active material layer 12, such that no blurred boundary line in the edge area of the insulation layer 14 close to the active material layer 12 due to mixing of coating slurry is formed. In this way, a clear boundary line 15 is formed.

Figure 8:
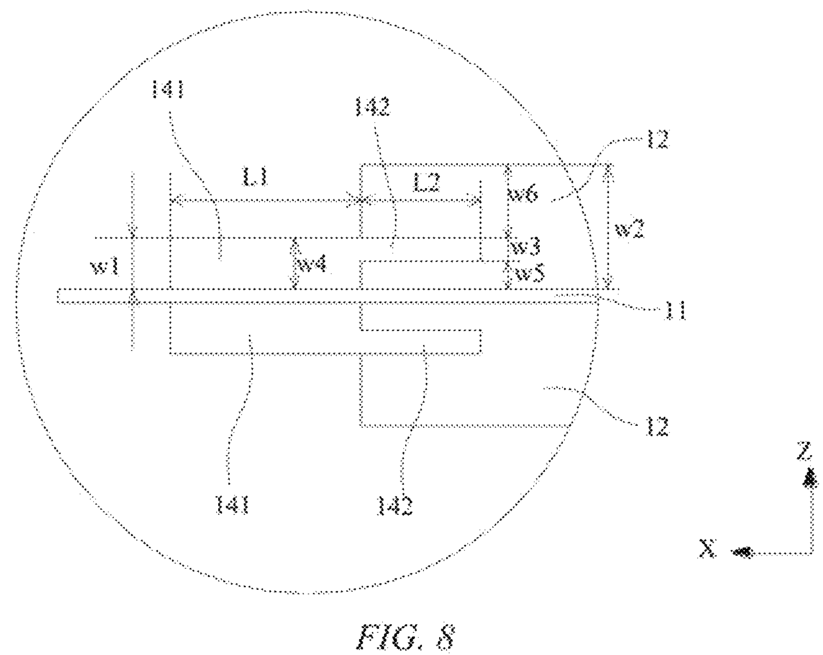
FIG. 8 is an enlarged view of part I in FIG. 7.

FIG. 8 is an enlarged view of part I in FIG. 7.

As shown in FIG. 8, in the thickness direction Z of the plate, the insulation layer 14 has a thickness w1 not greater than a thickness w2 of the active material layer 12, that is, w1≤w2. In this embodiment, the thickness w1 of the insulation layer 14 refers to a maximum thickness of the insulation layer 14. The active material layer 12 preferably has the thickness w2 ranging from 50 to 400 micron (μm). The insulation layer has preferably the thickness w1 ranging from 3 μm to 90 μm. When the active material layer 12 covers the second part 142, coating slurry of the second part 142 comes into contact with the coating slurry inside the active material layer 12. Due to a great thickness difference between the thickness w2 of the active material layer 12 and the thickness w1 of the insulation layer 14, even if the coating slurry of the second part 142 is mixed with the coating slurry inside the active material layer 12, mixed slurry cannot permeate into the upper surface of the active material layer 12.

In a particular embodiment, a thickness w4 of the first part 141 refers to a maximum thickness of the insulation layer 14, that is w4=w1.

The second part 142 has a thickness w3 not greater than the thickness w4 of the first part 141, that is, w3≤w4. The second part 142 has the thickness w3 smaller than the thickness w4 of the exposed first part 141 outside the active material layer 12, such that the second part 142 with the smaller thickness extends into the active material layer 12. The thickness w3 of the second part is smaller such that a coating thickness of an area where the active material layer 12 covers the second part 142 will not be significantly increased to cause a bulged edge, which ensures the uniformity of the overall thickness of the battery plate 1. Thus, when the battery plate 1 after being coated is wound into a plate roll, the risk that the battery plate 1 may burst and break during winding due to the bulged edge of the battery plate 1 is reduced.

In the thickness direction Z of the plate, a shortest distance w5 between a surface of the second part 142 facing the current collector 11 and a surface of the current collector 11 should satisfy 0≤w5≤0.9×w2, that is, the shortest distance w5 between the surface of the second part 142 facing the current collector 11 and the surface of the current collector 11 should be less than or equal to 90% of the thickness w2 of the active material layer 12. In a particular embodiment, the shortest distance w5 between the surface 1421 of the second part 142 facing the current collector 11 and the surface of the current collector 11 is between 0 μm and 90 μm.

The surface of the second part 142 facing the current collector 11 is a lower surface of the second part 142 in the thickness direction Z of the plate. A surface of the second part 142 away from the current collector 11 is an upper surface of the second part 142 in the thickness direction Z of the plate.

The second part 142 extends into the active material layer 12, the active material layer 12 may cover the upper surface and the lower surface of the second part 142 in the thickness direction Z of the plate and an end face of the second part 142 extending into the active material layer 12 in the width direction X of the plate. The active material layer 12 may also cover only the upper surface and the end face of the second part 142 in the thickness direction Z of the plate. In this case, the shortest distance w5 between the surface of the second part 142 facing the current collector 11 and the surface of the current collector 11 is 0, that is, the surface of the second part 142 facing the current collector 11 is directly applied on the current collector 11.

The shortest distance w5 between the surface of the second part 142 facing the current collector 11 and the surface of the current collector 11 may be set such that it can be ensured that the second part 142 is sufficiently close to the current collector 11 and far away from an outer surface of the active material layer 12, reducing the possibility of the coating slurry of the second part 142 permeating to the outer surface of the active material layer 12.

In some embodiments, in the thickness direction Z of the plate, a distance w6 between a surface of the second part 142 away from the current collector 11 and the outer surface of the active material layer 12 should satisfy 0.01×w2≤w6≤0.9×w2. In a particular embodiment, the distance w6 between the surface of the second part 142 away from the current collector 11 and the outer surface of the active material layer 12 is not less than 20 μm.

The distance w6 between the surface of the second part 142 away from the current collector 11 and the outer surface of the active material layer 12 may be set such that it can be ensured that the second part 142 is sufficiently far away from the outer surface of the active material layer 12, reducing the possibility of the coating slurry of the second part 142 permeating to the outer surface of the active material layer 12.

In some embodiments, the thickness w3 of the second part 142 should satisfy 0.01×w2≤w3≤0.9×w2. In a particular embodiment, the second part 142 has the thickness w3 of 3 μm-90 μm.

The thickness w3 of the second part 142 is set to be relatively small, and a change of a coating thickness of an overlapping area of the active material layer 12 and the second part 142 may also be relatively small, which will not resulting in a bulged edge due to a significant increase in the coating thickness of the overlapping area of the active material layer 12 and the insulation layer 142, such that the uniformity of the overall thickness of the battery plate 1 is ensured. Thus, when the battery plate 1 is wound into the electrode assembly 100, the risk of a bulged edge of the battery plate 1 is reduced.

The electrode tab 111 is generally obtained by die-cutting a substrate of the battery plate 1. A die-cutting position for the electrode tab 111 needs to be on the insulation layer 14, so the insulation layer 14 needs to have a certain width. In some embodiments, a width L1 of the first part 141 is between 0.1 millimeter (mm) and 15 mm, so as to ensure that the die-cutting position for the electrode tab 111 is located on the first part 141.

In an arrangement direction of the active material layer 12 and the insulation layer 14 (the width direction X of the plate), the second part 142 has a width L2 not greater than the width L1 of the first part 141, that is, L2≤L1. In some embodiments, the width L2 of the second part 142 is between 0.01 mm and 2 mm, such that the projections of the active material layer 12 and the second part 142 are ensured to overlap in the thickness direction Z of the plate, and an overlapping width of the second part 142 and a first coating layer 12 is prevented from being too great.

Figure 9:
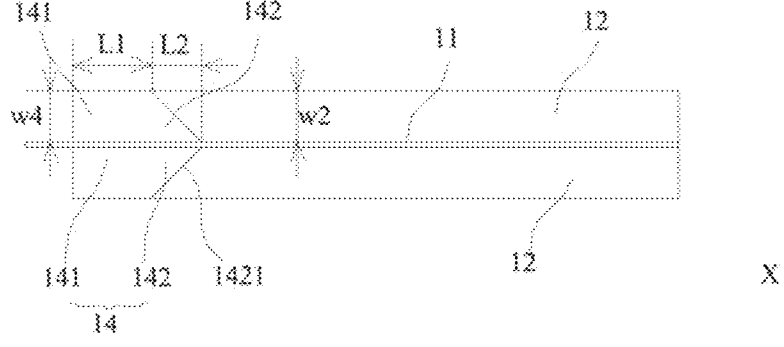
FIG. 9 is a sectional view of a battery plate according to another embodiment.

FIG. 9 is a sectional view of a battery plate 1 according to another embodiment.

As shown in FIG. 9, in some embodiments, the surface of the second part 142 away from the current collector 11 is a bevel 1421, and the bevel 1421 gradually gets closer to the current collector 11 in a direction extending from the first part 141 to the active material layer 12. In this case, the projections of the active material layer 12 and the second part 142 in the thickness direction of the plate overlap, and the thickness w3 of the second part 142 gradually decreases from a position where the second part meets the first part 141 in a direction opposite the width direction X of the plate, such that the risk of formation of a bulged edge due to an increase in the total thickness of coatings in the overlapping area of the active material layer 12 and the second part 142 is reduced. Also, after both the active material layer 12 and the second part 142 are applied, during drying of the coatings, the active material layer 12 tends to slip along the bevel 1421 when shrinking, such that the permeation and mixing of the coating slurry of the second part 142 into the active material layer 12 are reduced.

In FIG. 9, in the thickness direction Z of the plate, the first part 141 has the thickness w4 equal to the thickness w2 of the active material layer, which is only an example.

Figure 10:
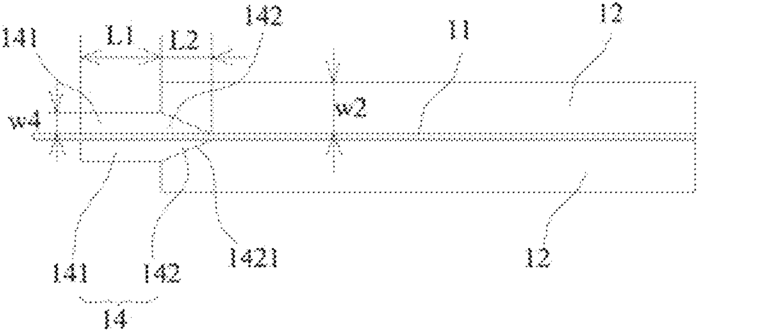
FIG. 10 is a sectional view of the battery plate according to yet another embodiment.

FIG. 10 is a sectional view of the battery plate 1 according to yet another embodiment.

As shown in FIG. 10, in some other embodiments, the surface of the second part 142 away from the current collector 11 is the bevel 1421, and in the thickness direction Z of the plate, the first part 141 has the thickness w4 less than the thickness w2 of the active material layer. In the embodiments, since the insulation layer 14 has a smaller thickness than the active material layer 12, the problem of the formation of a bulged edge caused by a significant increase in the coating thickness of the overlapping area of the active material layer 12 and the insulation layer 142 due to the mixing of the coating slurry may be reduced.

Of course, the shape of the second part 142 in the present application is not limited to those described in the foregoing embodiments, and may be a combination of various structural shapes of various embodiments in the present application.

The battery plate 1 provided by the present application is coated with the active material layer 12 and the insulation layer 14. The insulation layer 14 includes the first part 141 and the second part 142 that are connected. The second part 142 is located in the edge area of the insulation layer 14 close to the active material layer 12. The active material layer 12 is configured to cover the second part 142, such that the projections of the active material layer 12 and the insulation layer 14 partially overlap in the thickness direction Z of the plate. The second part 142 cannot permeate into the upper surface of the active material layer 12, such that no blurred interface in the edge area of the insulation layer 14 close to the active material layer 12 due to the mixing of coating slurry is formed. In this way, the clear boundary line 15 is formed.

In the electrode assembly 100, the battery cells D and the battery B composed of the battery plates 1 of the present application, it can be ensure that the negative plate 1*b* covers the positive plate 1*a*, which reduces the risk of lithium precipitation of the battery and improves the safety performance of the battery.

The foregoing descriptions are merely preferred embodiments of the present application, but are not intended to limit the present application. For those skilled in the art, the present application may have various modifications and variations. Any modifications, equivalent substitutions, improvements, and the like made within the spirit and principle of the present application should be included within the scope of protection of the present application.

The invention claimed is:

1. A battery plate, comprising a current collector, wherein at least one face of the current collector comprises a coated area and an uncoated area that are connected, the coated area is coated with an active material layer and an insulation layer, and the insulation layer is located on one side of the active material layer closer to the uncoated area, wherein the insulation layer comprises a first part and a second part that are directly connected, the second part is located in an edge area of the insulation layer closer to the active material layer, and the active material layer is configured to cover the second part and not cover the first part, such that the active material layer overlaps with the second part of the insulation layer and does not overlap with the first part of the insulation layer in a thickness direction of the plate, the insulation layer has a maximum thickness less than a maximum thickness of the active material layer, and wherein in the thickness direction of the plate, a shortest distance between a surface of the second part facing the current collector and a surface of the current collector facing the second part is greater than 0 μm and smaller than 90 μm.

2. The battery plate according to claim 1, wherein the second part has a maximum thickness less than or equal to a maximum thickness of the first part.

3. The battery plate according to claim 1, wherein a surface of the second part away from the current collector is a bevel, and the bevel gradually gets closer to the current collector in a direction extending from the first part to the active material layer.

4. The battery plate according to claim 1, wherein in the thickness direction of the plate, a distance between a surface of the second part away from the current collector and an outer surface of the active material layer is not less than 20 μm.

5. The battery plate according to claim 1, wherein the second part has a maximum thickness of 3 μm-90 μm.

6. The battery plate according to claim 1, wherein in an arrangement direction of the active material layer and the insulation layer, the second part has a maximum width less than or equal to the maximum width of the first part.

7. An electrode assembly, comprising the battery plate of claim 1.

8. A battery cell, comprising the electrode assembly of claim 7.

9. A battery, comprising a plurality of battery cells comprising the battery cell of claim 8.

10. A power consuming device, comprising the battery of claim 9, wherein the battery is configured to provide electric energy.

11. The battery plate according to claim 1, wherein the second part has a maximum thickness less than a maximum thickness of the first part.

* * * * *